United States Patent [19]

Moncur et al.

[11] 4,116,542
[45] Sep. 26, 1978

[54] METHOD AND APPARATUS FOR REDUCING COHERENCE OF HIGH-POWER LASER BEAMS

[75] Inventors: Norman K. Moncur; Frederick J. Mayer, both of Ann Arbor, Mich.

[73] Assignee: KMS Fusion, Inc., Ann Arbor, Mich.

[21] Appl. No.: 687,927

[22] Filed: May 19, 1976

[51] Int. Cl.$^2$ .............................................. G02B 0/00
[52] U.S. Cl. ............................ 350/321; 219/121 LM; 350/151
[58] Field of Search ................ 350/147, 151, 321, 3.5; 331/94.5, DIG. 1; 330/43, 4.3; 219/50, 54, 121 L, 121 M, 4; 176/19 R

[56] References Cited

U.S. PATENT DOCUMENTS

| | | | |
|---|---|---|---|
| 3,484,152 | 12/1969 | Robinson | 350/151 |
| 3,489,645 | 1/1970 | Daiber et al. | 331/DIG. 1 |
| 3,866,139 | 2/1975 | Currie | 331/94.5 M |
| 3,881,084 | 4/1975 | Boardsen | 219/121 LM |
| 3,898,587 | 8/1975 | Brinkman et al. | 331/94.5 |
| 3,937,917 | 2/1976 | Consoli | 219/121 LM |
| 4,019,151 | 4/1977 | Brueckner et al. | 330/4.3 |

Primary Examiner—John K. Corbin
Assistant Examiner—B. W. delos Reyes
Attorney, Agent, or Firm—Barnes, Kisselle, Raisch & Choate

[57] ABSTRACT

Method and apparatus for reducing the coherence and for smoothing the power density profile of a collimated high-power laser beam in which the beam is focused at a point on the surface of a target fabricated of material having a low atomic number. The initial portion of the focused beam heats the material to form a hot reflective plasma at the material surface. The remaining, major portion of the focused beam is reflected by the plasma and recollected to form a collimated beam having reduced beam coherence.

17 Claims, 3 Drawing Figures

METHOD AND APPARATUS FOR REDUCING COHERENCE OF HIGH-POWER LASER BEAMS

The present invention relates to laser systems and, more particularly, to an improved method and apparatus for producing high-power collimated laser beams.

Methods and apparatus for producing high-power collimated laser beams have found many uses and applications in the art, not the least significant of which is the use of such methods and apparatus in laser research. Conventional high-power lasers produce a highly coherent light beam, either pulsed or continuous-wave, having a relatively narrow bandwidth, as on the order of five angstroms, for example. It has heretofore been recognized that high beam coherence, which is a measure of the phase relationship of various beam portions either spatially, i.e., across the beam profile, or temporally, i.e., along the beam axis, tends to produce several undesirable effects. For example, amplification of a highly coherent laser beam may cause interference between adjacent portions of the beam, and thereby tend to produce spatial or temporal beam "hot spots", i.e., areas of higher-than-average energy in the beam profile or length. Because the refractive index of materials varies with beam intensity, hot spots in the beam may not only cause damage to the various laser system elements, but also tend to collapse the beam profile, thereby intensifying the hot spots. This effect is referred to as beam self-focusing. Moreover, high coherence in a collimated laser beam increases the tendency for diffraction ring formation around the beam profile. These inherent problems associated with highly coherent laser beams have heretofore prompted efforts to reduce beam coherence. However, no practical method or apparatus has yet been proposed for reducing beam coherence without detrimentally affecting or, indeed, destroying beam collimation.

Accordingly, it is a general object of the present invention to provide a method and apparatus for reducing the spatial and/or temporal coherence of a collimated laser beam without detrimentally affecting beam collimation.

More specifically, it is an object of the present invention to provide a method and apparatus for smoothing the profile of a high-power laser beam, thereby permitting the use of higher beam power densities and, at the same time, reducing the likelihood of damage to refractive or reflective elements in the laser system.

In furtherance of the object stated immediately above, it is another object of the invention to provide a method and apparatus for increasing the bandwidth, and thereby effectively reducing the coherence, of a collimated laser beam.

It is a further object of the present invention to provide a method and apparatus for effectively isolating the downstream laser system elements from low energy pulses or radiation emanating from the upstream beam source.

In accordance with the method provided by the present invention, the above and other objects are accomplished by focusing a collimated, highly coherent light beam onto a surface preferably fabricated of material having a relatively low atomic number. A portion of the material surface is heated by the initial or leading portion of the focused beam energy to form a hot reflective plasma around the focus point, which plasma reflects the remaining or trailing portion of the focused beam back onto the incident beam path. Such plasma reflection not only directly reduces spatial and temporal beam coherence, but also increased beam bandwidth, thereby providing further indirect reduction of beam coherence. The reflected beam portion is recollected to form a collimated light beam with substantially reduced beam coherence.

The novel features which are considered to be characteristic of the present invention are set forth in particular in the appended claims. The invention itself, however, together with additional objects, features and advantages thereof, may be best understood from the following description when read in conjunction with the accompanying drawings in which:

Figure 1:
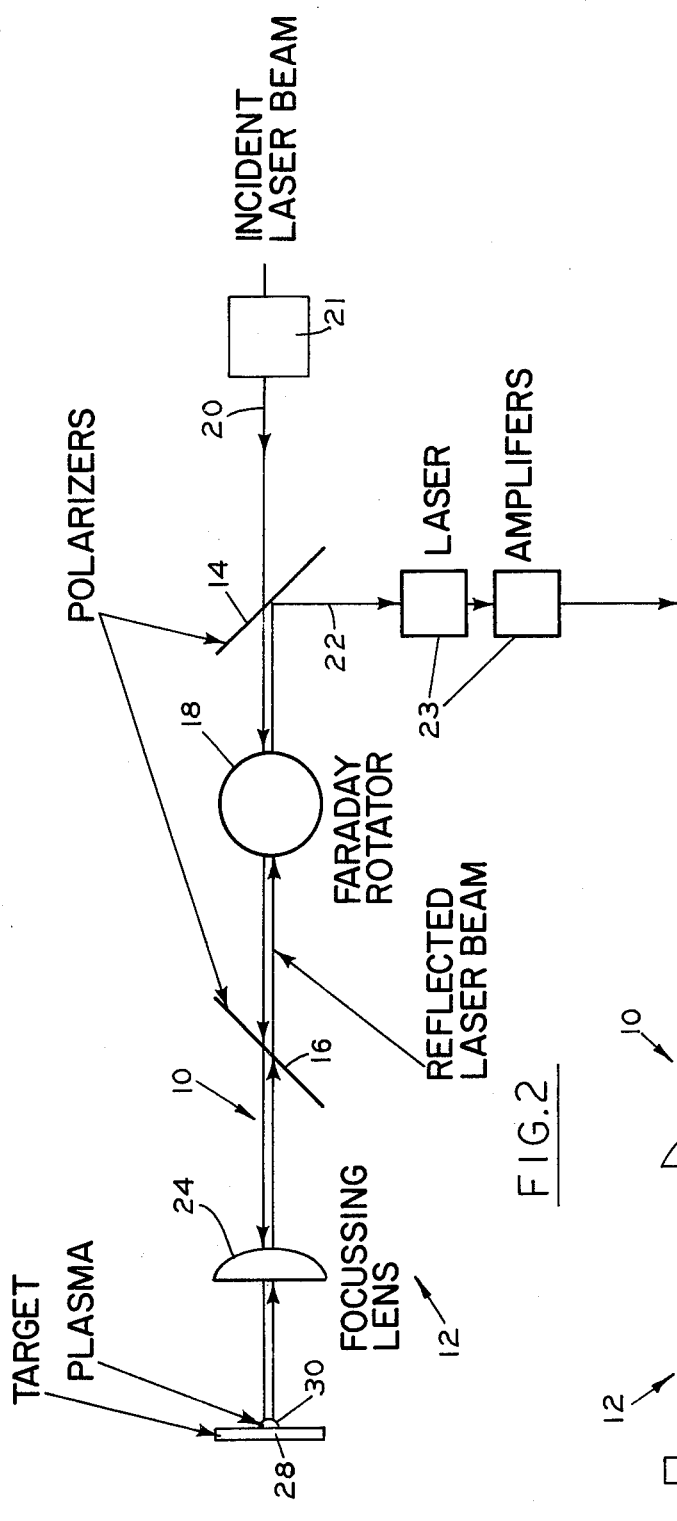
FIG. 1 is a schematic diagram of a presently preferred embodiment of an optical system for practicing the invention.

Referring to FIG. 1, a bidirectional beam path 10 is defined at one end by reflective means 12 and at the other end by a polarizer plate 14. A second polarizer plate 16 is disposed on path 10 and is oriented with respect to polarizer 14 such that polarizer 16 passes light linearly polarized at an angle of 45° with respect to linearly polarized light passed by polarizer 14. A Faraday rotator 18 is disposed on path 10 between polarizers 14 and 16 to cumulatively rotate the plane of polarization of linearly polarized light by an angle of 45° during passage therethrough in either direction.

In the general operation of the embodiment of FIG. 1 as thus far described, a coherent, highly collimated input laser beam is incident upon polarizer 14 along a path 20 from an amplifier 21, for example, and is directed or passed by polarizer 14 onto bidirectional beam path 10. The incident beam may originate from any suitable, conventional laser system (not shown). Preferably, the incident beam is linearly polarized in the direction of polarizer 14 so that maximum beam energy is passed onto beam path 10 to eventually emerge as an output beam. The incident beam is passed through and rotated by Faraday rotator 18, and then passed by polarizer 16 onto reflective means 12. Reflective means 12 is effectively disposed normal to beam path 10 such that a portion of the beam incident thereon is reflected back onto path 10, through polarizer 16 and Faraday rotator 18, where the beam polarization is rotated by an additional angle of 45°. After being cumulatively rotated by rotator 18 during passage therethrough in both directions, the reflected beam incident upon polarizer 14 is polarized at an angle of 90° with respect to the input beam, and is thus reflected by polarizer 14 onto an output beam path 22 to suitable downstream laser components, exemplified by the amplifiers 23. Output beam path 22 is orthogonal to input beam path 20. The general provision and several advantages of the structure thus far described in connection with FIG. 1 is disclosed and discussed in greater detail in the copending application at Brueckner et al, Ser. No. 468,176 now U.S. Pat. No. 4,019,151, filed Aug. 26, 1975 and assigned to the assignee hereof. It will be recognized that, although the incident and reflected beams are depicted separately with directional arrows in FIG. 1, the paths of such beams are actually coincident on the bidirectional beam path generally indicated at 10.

Figure 2:
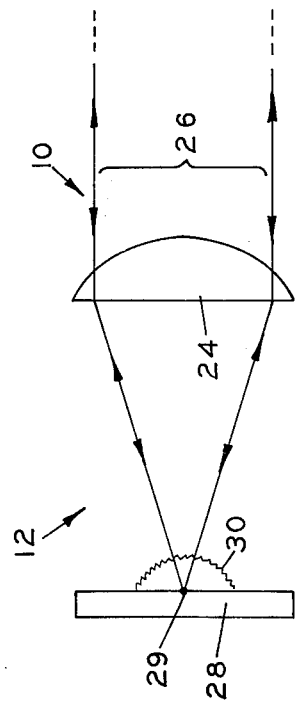
FIG. 2 is an enlarged view of a portion of FIG. 1 and is useful in understanding the operation of the invention.

In accordance with the present invention, referring to FIGS. 1 and 2, reflective means 12 comprises a lens 24 disposed on beam path 10 to focus a collimated incident beam, generally indicated at 26 (FIG. 2), onto a target disc 28. Preferably, the focal point 29 of lens 24 is at substantially the adjacent material surface of disc 28. Thus, the energy of collimated beam 26 is focused over a very small area of material surface on disc 28. The initial or leading portion of such focused energy reaches the surface of disc 28 and heats a portion of the material surface to form a hot reflective plasma 30 about the focus point. The trailing or remaining, major portion of the incident beam, i.e., that portion reaching the disc after plasma formation, is reflected by plasma 30 back toward lens 24, and is recollimated thereby and passed to polarizer 16. Thus, lens 24 serves the dual purpose of focusing the collimated beam onto the material surface for plasma formation, and recollecting and recollimating that portion of the beam energy reflected by the plasma. In addition to effectively "scattering" the phase relationship of adjacent beam portions, plasma 30 scatters somewhat the polarization of the reflected beam, so that a small portion of the reflected beam is not passed by polarizer 16 and is lost. The remaining, major portion of the reflected beam eventually appears on output path 22 as described above.

To prevent the focused beam from ionizing the air around focal point 29, target disc 28 is preferably disposed in an evacuated chamber (not shown). Disc 28 is preferably fabricated of material having a low average atomic number. Such material is referred to in the art, and is referred to hereinafter, as having a low "$\bar{Z}$" (wherein the bar indicates average Z). Examples of preferred materials include polyethylene ($\bar{Z}$ = 2.66), carbon ($\bar{Z}$ = 6) and lithium hydride ($\bar{Z}$ = 2). Such low $\bar{Z}$ materials are preferred because the plasma formed thereby is hotter for a given amount of focused energy than would be a plasma formed from heavier materials. The effectiveness of the invention in reducing beam coherence is considered to be related to plasma temperature. In a working embodiment of the invention, a target disc 28 fabricated of polyethylene material was found to yield highly satisfactory results at an estimated plasma temperature of about two to three million degrees Kelvin. A collimated beam 26 having a total power density of $2 \times 10^9$ watts/cm$^2$ and a total energy of about one joule was focused onto the surface of the polyethylene disc. The reflected beam had a power density of $2 \times 10^8$ watts/cm$^2$ and a total energy of 0.15 joule, meaning that 85 percent of the input beam energy was used in plasma formation or lost in stray reflections. The spatial coherence of the reflected collimated beam was reduced by a factor of six when measured with a 40 percent beam overlap. The bandwidth of the reflected beam was increased from about five angstroms to about 20 to 40 angstroms giving a temporal coherence length of 0.25 mm.

In addition to "smoothing" the collimated output beam as intended, the invention has the additional, somewhat surprising advantage of effectively isolating the downstream system components, such as amplifiers 23, from spurious pulses or other undesirable low energy illumination emanating from the upstream components, such as amplifier 21. For example, pumped laser amplifiers tend to emit a low energy radiation termed "amplifier fluorescence" in the art. Such radiation emanating from amplifier 21 would be of insufficient energy content, even when focused by lens 24, to heat material 28 to a temperature at which reflective plasma 30 is formed. Rather, the low energy radiation will be absorbed or scattered by the disc.

Figure 3:
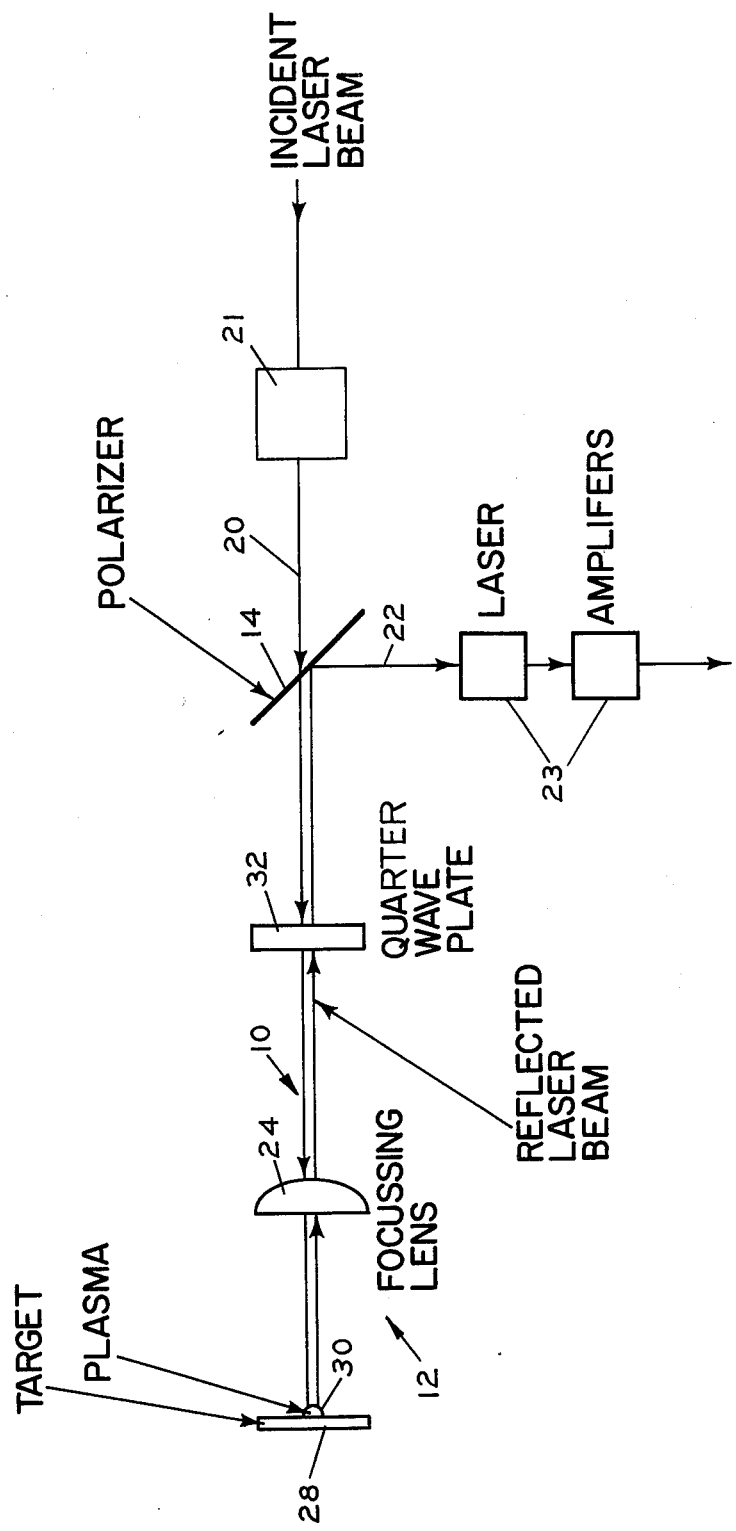
FIG. 3 is a schematic view of an alternative embodiment of an optical system for practicing the invention.

It will be apparent from the foregoing discussion that the embodiment of the invention shown in FIG. 1, and the method described in connection therewith, fully satisfy all of the objects and aims set forth above. Although the invention has heretofore been described in connection with a specific embodiment thereof, many alternatives, modifications and variations will suggest themselves to persons skilled in the art in view of the foregoing description. One such modification is schematically depicted in FIG. 3, wherein reference numerals identical to those used in FIGS. 1 and 2 indicate identical elements. In the embodiment of FIG. 3 rotator 18 and polarizer 16 of FIG. 1 are replaced by a conventional quarter wave plate 32. Plate 32 converts the linearly polarized collimated beam passed by polarizer 14 into a circularly polarized beam. The circularly polarized beam is focused onto disc 28, reflected by plasma 30, recollimated by lens 24 and then reconverted by plate 32 to a linearly polarized beam having a plane of polarization at an angle of 90° with respect to the polarization angle of the incident beam. The linearly polarized reflected beam is directed by polarizer 14 onto output beam path 22.

The invention is described in connection with FIGS. 1–3 primarily in schematic form, and various mechanical details which will be self-evident to persons skilled in the art have been omitted. For example, it will be apparent that, in actual practice, each of the elements depicted in the drawings comprises a three-dimensional body which must be suitably mounted. Each of the described elements, with the exception of disc 28, is itself well known, and suitable apparatus for mounting and positioning each element to yield the disclosed combination will be self-evident to the skilled artisan, given the information herein provided. Each burn caused by a focused beam on the surface of target 28 leaves a small pit or depression therein. Hence, to insure that focal point 29 is as close as possible to or, preferably, at the material surface for the next beam to be focused, suitable means (not shown) must be provided for repositioning the target disc prior thereto.

Although the target material has been disclosed as a disc 28, it will be evident that other structural target geometries may be used where desired. For example, the target material may comprise a small sphere or hollow shell, on the order of 50 micrometers in diameter, adapted to be adjustably positioned at lens focus 29. In an automated illumination system, target disc 28 may conceivably be replaced by a rod of low Z material having a plane material end surface disposed normal to the beam path and at which focal point 29 is positioned. After each burn, the target rod could be automatically moved axially toward lens 24 by an incremental distance equal to the calculated or empirically-determined burn pin depth. Accordingly, the invention is intended to embrace the above-noted and all other modifications and variations as fall within the spirit and broad scope of the appended claims.

The invention claimed is:

1. In an optical system comprising means for producing a collimated coherent light beam and a plurality of optical components disposed on a beam path, a method for reducing coherence of said beam comprising the steps of focusing a beam traveling on said path onto a target to burn at least a portion of said target with a leading portion of said beam and to form a reflective plasma which reflects a portion of said beam trailing said leading portion, recollimating a portion of said beam reflected by said plasma and redirecting said recollimated beam portion back onto said path.

2. A method of isolating components of an optical system disposed on a beam path comprising the steps of providing target means composed of material which burns to form an optically reflective plasma when irradiated by an optical beam having beam energy above a preselected energy threshold, directing a beam traveling on said path in said system onto said target to burn a portion of said target and form said reflective plasma, collecting beam energy reflected by said plasma, and redirecting said collected beam back onto said beam path, system components downstream of said target being isolated from components upstream of said target for beams below said energy threshold.

3. The method set forth in claim 2 wherein said material has a low average atomic number such as polyethylene, carbon and lithium hydride.

4. The method set forth in claim 3 wherein said material is selected from the group consisting of polyethylene, carbon and lithium hydride.

5. The method set forth in claim 3 wherein said material is polyethylene.

6. In an optical system for generating an output beam and which includes a plurality of optical components disposed on a beam path, the combination comprising target means composed of material which burns to form a beam-reflective plasma when irradiated by a beam having beam energy above an energy threshold, means disposed in said beam path among said system components to direct a beam traveling on said path from upstream system components onto said target means such that at least a portion of said target is burned to form a said reflective plasma and means disposed to redirect a beam portion reflected by said plasma to downstream system components to generate a said output beam, said target thereby isolating said downstream system components from said upstream system components for beams having beam energy below said threshold.

7. The system set forth in claim 6 wherein said target means is composed of material having a low average atomic number such as polyethylene, carbon and lithium hydride.

8. The apparatus set forth in claim 7 wherein said target means is composed of material selected from the group consisting of polyethylene, carbon and lithium hydride.

9. The apparatus set forth in claim 6 wherein said directing means comprises means focusing said beam onto said material.

10. The apparatus set forth in claim 9 wherein said focusing means comprises a lens.

11. The apparatus set forth in claim 10 wherein said target means comprises means providing a plane material surface disposed normal to said beam path.

12. The apparatus set forth in claim 11 wherein said target means comprises a disc composed of polyethylene.

13. The system set forth in claim 6 wherein said redirecting means further comprises a polarizer disposed in said beam path and means disposed between said polarizer and said target means to operatively rotate the plane of polarization of a beam passing therethrough to and from said target means by a total angle of 90°.

14. A method for producing a high-power collimated laser output beam comprising the steps of (a) generating a coherent highly collimated input laser beam, (b) reducing coherence of said input beam by directing said input beam onto a target material and heating a portion of said target material with a leading portion of said directed input beam to form a reflective plasma, A trailing portion of said directed input beam being reflected by said plasma, and then (c) redirecting said reflected trailing portion of said directed input beam onto an output beam path.

15. The method set forth in claim 14 wherein said step (c) comprises the step of recollimating said reflected trailing beam portion such that said output beam is a collimated beam.

16. The method set forth in claim 15 wherein said step (b) comprises the step of focusing said input beam at substantially an opposing surface of said target material.

17. The method set forth in claim 16 wherein said beam is focused on an axis which is substantially normal to said material surface.

* * * * *